United States Patent
Horowitz et al.

(10) Patent No.: US 11,630,642 B2
(45) Date of Patent: *Apr. 18, 2023

(54) SYSTEMS AND METHODS FOR MANAGING A DATABASE BACK END AS A SERVICE

(71) Applicant: MongoDB, Inc., New York, NY (US)

(72) Inventors: Eliot Horowitz, New York, NY (US); Michael Patrick O'Brien, New York, NY (US); Eric Robert Daniels, New York, NY (US)

(73) Assignee: MongoDB, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/924,977

(22) Filed: Jul. 9, 2020

(65) Prior Publication Data

US 2020/0341737 A1  Oct. 29, 2020

Related U.S. Application Data

(63) Continuation of application No. 16/010,025, filed on Jun. 15, 2018, now Pat. No. 10,761,811, and a continuation of application No. 16/010,034, filed on Jun. 15, 2018, now Pat. No. 10,754,625.

(60) Provisional application No. 62/521,303, filed on Jun. 16, 2017, provisional application No. 62/521,303, filed on Jun. 16, 2017.

(51) Int. Cl.
*G06F 8/30* (2018.01)
*G06F 8/40* (2018.01)
*G06F 16/25* (2019.01)
*H04L 9/40* (2022.01)
*G06F 16/2452* (2019.01)
*G06F 9/455* (2018.01)
*G06F 21/62* (2013.01)

(52) U.S. Cl.
CPC .............. *G06F 8/31* (2013.01); *G06F 8/40* (2013.01); *G06F 9/45558* (2013.01); *G06F 16/2452* (2019.01); *G06F 16/252* (2019.01); *G06F 21/629* (2013.01); *G06F 21/6218* (2013.01); *G06F 21/6227* (2013.01); *H04L 63/102* (2013.01); *G06F 2009/45575* (2013.01); *G06F 2221/2141* (2013.01); *H04L 63/08* (2013.01)

(58) Field of Classification Search
CPC ...... G06F 8/31; G06F 16/252; G06F 16/2452; G06F 21/6218; G06F 21/629; G06F 8/40; H04L 63/102
See application file for complete search history.

(56) References Cited

U.S. PATENT DOCUMENTS

| | | | |
|---|---|---|---|
| 10,754,625 | B2 | 8/2020 | Horowitz et al. |
| 10,761,811 | B2 | 9/2020 | Horowitz et al. |
| 2004/0153908 | A1 | 8/2004 | Schiavone et al. |
| 2008/0215528 | A1* | 9/2008 | Sedlar .................. G06F 16/176 |

(Continued)

*Primary Examiner* — Wei Y Zhen
*Assistant Examiner* — Amir Soltanzadeh
(74) *Attorney, Agent, or Firm* — Wolf, Greenfield & Sacks, P.C.

(57) ABSTRACT

Systems and methods for managing a database back end as a service are described. In some aspects, the described systems and methods provide for a cloud-based resource for servicing a request for data from an application to a remote database and/or a service. In some aspects, the described systems and methods provide for a cloud-based application client for requesting data from a remote database and/or a service.

18 Claims, 10 Drawing Sheets

(56) References Cited

U.S. PATENT DOCUMENTS

| | | |
|---|---|---|
| 2013/0138666 A1 | 5/2013 | Muller et al. |
| 2016/0092173 A1 | 3/2016 | Rodrigues et al. |
| 2016/0269237 A1* | 9/2016 | Higgins .............. H04W 12/065 |
| 2017/0076107 A1* | 3/2017 | Sundaram ............... G06F 16/93 |
| 2018/0129746 A1 | 5/2018 | Zhu et al. |
| 2018/0337929 A1* | 11/2018 | Kurian ................ G06F 21/6245 |
| 2018/0364988 A1 | 12/2018 | Horowitz et al. |
| 2018/0365440 A1 | 12/2018 | Horowitz et al. |

* cited by examiner

SYSTEMS AND METHODS FOR MANAGING A DATABASE BACK END AS A SERVICE

RELATED APPLICATIONS

This Application claims priority under 35 U.S.C. § 120 as a continuation of U.S. patent application Ser. No. 16/010,034, entitled "SYSTEMS AND METHODS FOR MANAGING A DATABASE BACK END AS A SERVICE," filed on Jun. 15, 2018, which claims priority under 35 U.S.C. § 119(e) to U.S. Provisional Application Ser. No. 62/521,303, entitled "SYSTEM AND METHOD FOR MANAGING A DATABASE BACK END AS A SERVICE," filed on Jun. 16, 2017, each of which are herein incorporated by reference in their entirety.

This Application claims priority under 35 U.S.C. § 120 as a continuation of U.S. patent application Ser. No. 16/010,025, entitled "SYSTEMS AND METHODS FOR MANAGING A DATABASE BACK END AS A SERVICE," filed on Jun. 15, 2018, which claims priority under 35 U.S.C. § 119(e) to U.S. Provisional Application Ser. No. 62/521,303, entitled "SYSTEM AND METHOD FOR MANAGING A DATABASE BACK END AS A SERVICE," filed on Jun. 16, 2017, each of which are herein incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

As applications become larger and more complex, so do the use of external services. Whether third party services or microservices are being employed, the business intelligence of each and every service gets has its own fine grained usage pattern. Configuring new applications with these services occupies a large amount of development time and resource.

SUMMARY

To build applications today, a lot of groundwork goes into building an idea into an experience. For example, the new application may need to work with data the application generates and may also need to work with existing databases. For instance, the new application may need to integrate with third party services, such as AMAZON WEB SERVICES, TWILIO, and other suitable third party services. Such integration may require significant work to write code that connects the new application with the desired databases and service providers. Further efforts may be required to ensure that the new application can serve a large number of requests from different users on different platforms.

In some aspects, at least some of the systems and methods described herein provide for seamlessly joining database and service interactions and bringing them closer to the client layer for a new application. For example, the described systems and methods provide a novel way for the new application to work with a database built on a database platform, such as the MONGODB ATLAS database platform (available commercially from MongoDB Inc., New York, N.Y.), using a Representational State Transfer (REST)-compliant or REST-like API through which the database platform is accessed. In some implementations, the REST-compliant or REST-like API provides access to data in the database by using a uniform and predefined set of operations. Various systems and methods described herein provide a new application with complete access to create, read, update, and delete (CRUD) operations and to execute aggregation functions on the database platform. In some implementations, features of at least some of the described systems and methods may be accessed by the new application using IOS, JS, ANDROID, or other suitable Software Development Kits (SDKs). In some embodiments, methods and systems are provided for integrating third party services into the new application, e.g., for user authentication, for sending email, for working with storage, or for supporting another suitable third party service. In some embodiments, systems and methods are provided that allow for the new application to organize database and service actions using pipelines to communicate with one or more databases and/or services. In some embodiments, various systems and methods described herein provide for a set of integrated security and data access rules that works in conjunction with a database platform, such as the MONGODB ATLAS database platform (available commercially from MongoDB Inc., New York, N.Y.).

In some aspects, the described systems and methods provide one or more ways to access a database via a backend server or platform. In some embodiments, the described systems and methods provide for client applications to have direct database access via the backend server. Various conventional approaches only offer database access when code is written for the backend. Various systems and methods described herein provide functionality for client applications such that a developer of a new application is able to write database code within the application code as if it were written in the backend server. According to various embodiments, the integration of the back end as a service enables developers to quickly code his or her applications with most source living in one place, the frontend. For example, the development and/or processing required by conventional approaches is significantly reduced or even eliminated under the new model. According to some embodiments, the application developer need not architect a traditional backend system to handle/manage the data requests (e.g., to a database) for the application nor the integration with other services that also require database access or integration. In some examples, multiple integration points (e.g., two, three, four, five, six or more) each having its own coding format or even coding language (e.g., first format/language, second format/language, third format/language, fourth format/language, fifth format/language, sixth format/language or more) can be accessed via the same declarative statements used to code the client application.

In some embodiments, the backend server allows for developers to write code using declarative statements. The use of declarative statements may allow developers to model how their users can access their database for read and write operations. In some embodiments, the backend server receives a request, including a declarative statement, and treats the request against the database from the frontend as a request that is made from the context of a user. The backend server is configured to interpret one or more parameters, based on the declarative statement, to determine what the request is and whether it maps, for example, into executable read and/or write operations. In one example, the backend server interprets a write operation and determines which document is affected by the write operation (e.g., by mapping a specific operation on document type to a particular context for the write operation). For example, the backend server may parse the declarative statement into one or more tokens and determine that one of the tokens corresponds to a write operation.

In some implementations, a token includes a portion of a command operation, a portion of a text string, or another portion (including for example, defined by white space, punctuation, known format of operation, etc.) of the declarative statement. For example, for the declarative statement, collection.insertOne({owner_id:"user", text:"comment"}), a token may include the command operation "insertOne," the text string "comment," or another portion of the declarative statement. In some embodiments, a token may be parsed from the declarative statement based on a delimiter, such as white space, a punctuation mark, or another suitable delimiter. For example, for the same declarative statement, the command operation, "insertOne," may be parsed using punctuation marks "." and/or "(" that are specified before and/or after the command operation. In the same example, the text string, "comment," may be parsed using punctuation marks ":" and/or "}" that are specified before and/or after the text string.

The backend server may further analyze other tokens from the declarative statement to determine one or more documents to be updated by the write operation. In some embodiments, the write operation is applied to update a document locally without immediately returning the updated document to the database. The backend server may apply one or more rules associated with the database, such as a write rule, to determine whether the document may be modified by the current user. If the backend server determines that the document may be modified, the backend server may return the updated document for inclusion in the database. If the backend server determines that the document may not be modified, the backend server may discard the updated document and optionally return an error indicating that the write operation is not permitted for the current user. According to various embodiments, the backend server allows for developers to write code using declarative statements. The use of declarative statements allows developers to model how their users can access their database for read and write operations.

According to various embodiments, the system providing the described declarative functionality creates significant advantage over conventional approaches as execution of the declarative statements reduces development time, reduces complexity of the enabling code, and further makes it easier for the backend server (and developers or reviewers) to serialize and parse the code. In some examples, the architecture and declarative statement framework is especially suited to dynamic schema database implementations (e.g., the well-known MONGODB database, available commercially from MongoDB Inc., New York, N.Y.).

In some embodiments, the described systems and methods provide for access to the database via integrated services and pipelines for complex, multi-stage workflows. In some embodiments, the described systems and methods provide for access to the database platform via native SDKs for IOS, JS, ANDROID, or other suitable platforms. Any front end architecture may be handled as a result of providing SDKs for different platforms, e.g., IOS, JS, ANDROID, or other suitable platforms, that abstract away the database platform and/or third party service logic. Moreover, the configuration of applications using declarative statements, such as declarative rules, allows developers to configure "business logic" (rules) in a centralized location. For example, complex coding logic is devolved into logical declarative statements that the system maps into database functionality. This declarative functionality is particularly advantageous as compared to requiring developers to write tedious boilerplate backend code for access to the database platform, reducing the time and needed code to accomplish the same functions over conventional approaches.

In some embodiments, the described systems and methods provide for a complete database backend for a new application. In some embodiments, the described systems and methods allow for addition of a feature or features to an existing application, e.g., authentication, data from a new database or new database connection (including, for example, the MONGODB ATLAS database platform, available commercially from MongoDB Inc., New York, N.Y.), etc. In some embodiments, the described systems and methods allow for integration of a new service and/or new service API, e.g., text messaging feature, messaging application integration, etc. In some embodiments, the described systems and methods provide for different manners of exposing existing data. For example, the backend server may limit access to specific aggregations to allow analysts to work with the data without exposing any individual's private information. The backend server may provide one or more levels of data validation and access control, including authentication of the end user and per-field access controls. Unlike conventional systems which require the developer to write access code for every application, the described systems and methods allow for a developer to specify access using declarative statements, such as declarative rules, for access to the database. For example, the developer can hide private information using the declarative language, e.g., by specifying that the field address cannot be read when the amount of users in a collection exceeds 100 (a naive form of differential privacy).

In some aspects, the system can be architected to provide flexibility on how rules are enforced or enable privacy concerns during execution, enabling differential privacy semantics (e.g., a first set of privacy semantics for application access/integration, a second set of privacy semantics for external service access/integration, etc.), providing reasonable default execution parameters (which in some examples can be overridden by user selection or based on rule definition and execution). In further embodiments, the back end architecture is configured to enable code execution when performing rule based tasks. In some embodiments, the back end architecture includes definition of domains in which user, service instances, and applications exist or interact. Applications (e.g., mobile applications) are bound to specific domains (and can, for example, belong to more than one domain). In some embodiments, the system is configured to have access to all users bound within a given domain and further enables rules to be defined and executed to provide services for each, any, or combinations of applications.

In some aspects, the described systems and methods provide for rules to govern how data is accessed from the database. Declarative data access controls may be used to specify fine grained data access controls, base access on document, field, or value, authorize the user (or the application or both) and/or associate access with the user's profile or other suitable information. In some embodiments, the rules may be defined with JSON rules, thereby not requiring the developer to generate code to access the database that would traditionally be required.

In some aspects, the described systems and methods provide for a cloud-based resource for servicing a request for data from an application. The cloud-based resource receives the application request. The cloud-based resource parses the application request and applies write rules for access to one or more databases and/or one or more services. The cloud-based resource orchestrates retrieving the requested data from one or more databases and/or one or more services. In some embodiments, the cloud-based resource retrieves the requested data from a database and, based on the data from the database, generates a request to a service for additional data. The cloud-based resource aggregates the retrieved data and applies rules for access to the data by the application. Finally, the cloud-based resource delivers the data to the client.

In some aspects, the described systems and methods provide for a cloud-based resource and a method for servicing a request for data from an application to a remote database and/or a service. In some embodiments, the cloud-based resource includes a processor configured to implement a method for servicing a request for data from an application to a remote database and/or a service. In some embodiments, a request for data from a remote database and/or a service is received from a cloud-based application. A declarative statement is parsed from the request to determine one or more parameters. Using the parameters, one or more rules are applied to determine whether the application is allowed to make the request. In response to determining that the application is allowed to make the request, a database request is transmitted to the remote database and/or a service request is transmitted to the service. One or more results are received from the remote database and/or the service responsive to the database request and/or the service request. Using the parameters, one or more rules are applied to determine whether the application is allowed to receive the results. In response to determining that the application is allowed to receive the results, the results are transmitted to the application. According to some embodiments, the rules to determine whether the application is allowed to receive the results may be identical to, overlap with, or be mutually exclusive from the rules to determine whether the application is allowed to make the request.

In some embodiments, the request includes a create action, a read action, an update action, and/or a delete action relating to the remote database and/or the service.

In some embodiments, parsing the request from the application to determine one or more parameters includes translating a raw expression for the declarative statement from the request into a general match expression. In some embodiments, translating the raw expression for the declarative statement from the request into the general match expression includes interpolating the raw expression from the request to replace one or more placeholders in the raw expression with corresponding values. In some embodiments, translating the raw expression for the declarative statement from the request into the general match expression further includes converting the interpolated expression into the general match expression. In some embodiments, translating the raw expression for the declarative statement from the request into the general match expression further includes evaluating the general match expression against a value.

In some embodiments, the parameters includes a user identification. In some embodiments, applying the rules to determine whether the application is allowed to make the request includes applying, using the user identification, a rule to determine whether a user of the application is authorized to access the remote database and/or the service. In some embodiments, applying the rules to determine whether the application is allowed to receive the results includes applying, using the user identification, a rule to determine whether the user of the request is authorized to access the results.

In some embodiments, transmitting, based on the request, the database request to the remote database and/or the service request to the service includes transmitting the database request to the remote database, and, based on a response from the remote database, transmitting the service request to the service.

In some aspects, the described systems and methods provide for a cloud-based application client and a method for requesting data from a remote database and/or a service. In some embodiments, the cloud-based application client includes a processor configured to implement a method for requesting data from a remote database and/or a service. In some embodiments, a communication link is initialized from a cloud-based application to a cloud-based resource in communication with a remote database and/or a service. A request for data from the remote database and/or the service is transmitted to the cloud-based resource. A declarative statement from the request is parsed to determine one or more parameters for use by one or more rules. On or more rules are applied to determine whether the application is allowed to make the request. One or more rules are applied to determine whether the application is allowed to receive one or more results from the remote database and/or the service. The results are received from the remote database and/or the service responsive to the request, the rules applied to determine whether the application is allowed to make the request, and the rules applied to determine whether the application is allowed to receive the results from the remote database and/or the service. According to some embodiments, the rules to determine whether the application is allowed to receive the results may be identical to, overlap with, or be mutually exclusive from the rules to determine whether the application is allowed to make the request.

In some embodiments, the request includes a create action, a read action, an update action, and/or a delete action relating to the remote database and/or the service.

In some embodiments, the request includes the parameters as part of a raw expression for the declarative statement. The raw expression for the declarative statement from the request is translated into a general match expression. In some embodiments, translating the raw expression for the declarative statement from the request into the general match expression includes interpolating the raw expression from the request to replace one or more placeholders in the raw expression with corresponding values. In some embodiments, translating the raw expression for the declarative statement from the request into the general match expression further includes converting the interpolated expression into the general match expression. In some embodiments, translating the raw expression for the declarative statement from the request into the general match expression further includes evaluating the general match expression against a value. In some embodiments, the parameters include a user identification. In some embodiments, applying the rules to determine whether the application is allowed to make the request includes applying, using the user identification, a rule to determine whether a user of the application is authorized to access the remote database and/or the service. In some embodiments, applying the rules to determine whether the application is allowed to receive the results includes applying, using the user identification, a rule to determine whether the user of the request is authorized to access the results.

In some embodiments, receiving the results from the remote database and/or the service responsive to request includes receiving a portion of the results from the remote database responsive to a database request based on the request and receiving a remaining portion of the results from the service responsive to the service request based on the portion of the results from the remote database.

In some aspects, the described systems and methods provide for a cloud-based resource and a method for servicing a request from an application to access data from a remote database. In some embodiments, the cloud-based resource includes a processor configured to implement a method for servicing a request from an application to access data from a remote database. In some embodiments, a request to access data from a remote database is received from a cloud-based application. One or more fields to be accessed are determined from the request. A first set of rules is applied to determine whether the application is allowed to access the fields. In response to determining that the application is allowed to access the fields, based on the request and the fields, a database request is transmitted to the remote database. A second set of rules determines that the application is allowed to access results from the remote database responsive to the database request. Subsequently, the results from the remote database are accessed and transmitted to the application. According to some embodiments, the first set of rules and/or the second set of rules are applied by the cloud-based resource, the remote database, or another suitable system.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by reference signs, the reference signs have been included for the sole purpose of increasing the intelligibility of the figures, detailed description, and claims. Accordingly, neither the reference signs nor their absence is intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

To build applications today, an application developer may need to, among other things, support CRUD operations with data, specify access control rules on their data, and connect services together, and to their application, whether they are third-party services providing commodity functionality or proprietary services. Unfortunately, conventional systems require developers to create lines upon lines of the same time-draining, boilerplate backend code. Even if everything goes right with that code, it is a drain on productivity and executional efficiency. When things go wrong, the backend code becomes a liability, which can range from productivity costs to disastrous security risks. In some embodiments, the described systems and methods provide a layer adjacent to a database platform, such as the MONGODB ATLAS database platform (commercially available from MongoDB Inc., New York, N.Y.), for a new application to access the data it requires. In some examples, the layer may be implemented on a backend server that provides a REST complaint API to the database platform. In some examples, this API is configured to allow client code to interact directly with the database. In further examples, the backend server may provide a configuration-based access control system, enabling a flexible and powerful way to express precisely which users can perform what operations on what data. The backend server may also provide a uniform, document-centric mechanism to connect services with custom application code, and thus be configured to interact with dynamic schema databases while providing the backend architecture.

Access to the database via the provided layer may be implemented alongside existing code or form the basis for brand new applications. The provided layer, which may be implemented in the form of a backend server, may allow applications to perform one or more CRUD operations directly against the database, but with complete assurance that applications can only access data to the exact extent to which they are permitted to. Applications may include access to services with data operations that are input into pipelines, e.g., text messages routed from a service, such as TWILIO, can become documents that can flow to the database where they can be stored in the database and/or continue on to another service, e.g., S3, which can then be served via http.

Figure 1:
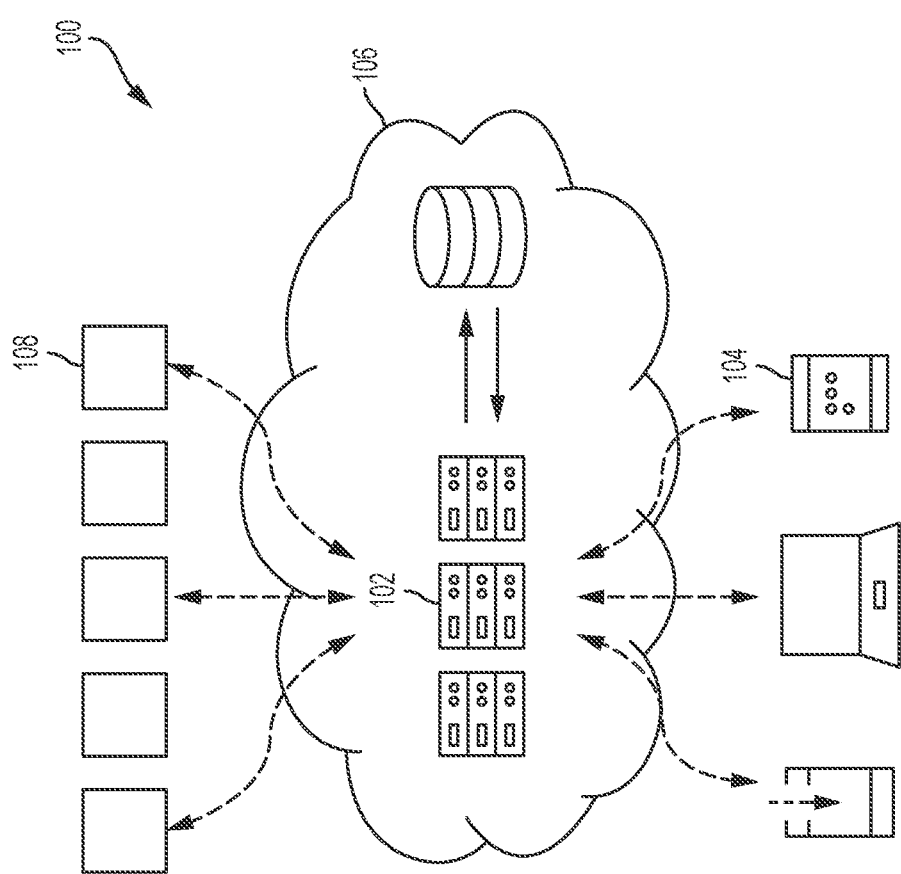
FIG. 1 is a block diagram for the backend as a service architecture, according to one embodiment.

According to one aspect, a back end framework is architected for integrating external services, providing management functions, and execution optimization analysis. According to various embodiments, the back end framework is deployed as a service so that application developers are able to build their application and simply configure their backend services through the framework rather than build back end functionality for the application itself. FIG. 1 illustrates the backend as a service architecture in the form of a block diagram 100. In FIG. 1, one or more backend servers 102 receive a data request from an application executing on one of clients 104. The client 104 may execute applications developed using the native IOS, JS, ANDROID, or other suitable SDKs. The backend server 102 may service the data request from the application executing on client 104. The data request may relate to a database 106 or one or more services 108.

According to another aspect, provided is a REST compliant API for attaching to a cloud implemented database (e.g., the well-known MONGODB database, available commercially from MongoDB Inc., New York, N.Y.) that enables access to raw database features while providing user level security, and integration to other execution environments for more complex processing and features sets. Traditionally direct access by a client application to a back end database enables too much authority. By validating client application requests at the API through the declarative statement framework and user context models, direct access is permitted with the assurance of security and permission control.

Figure 2:
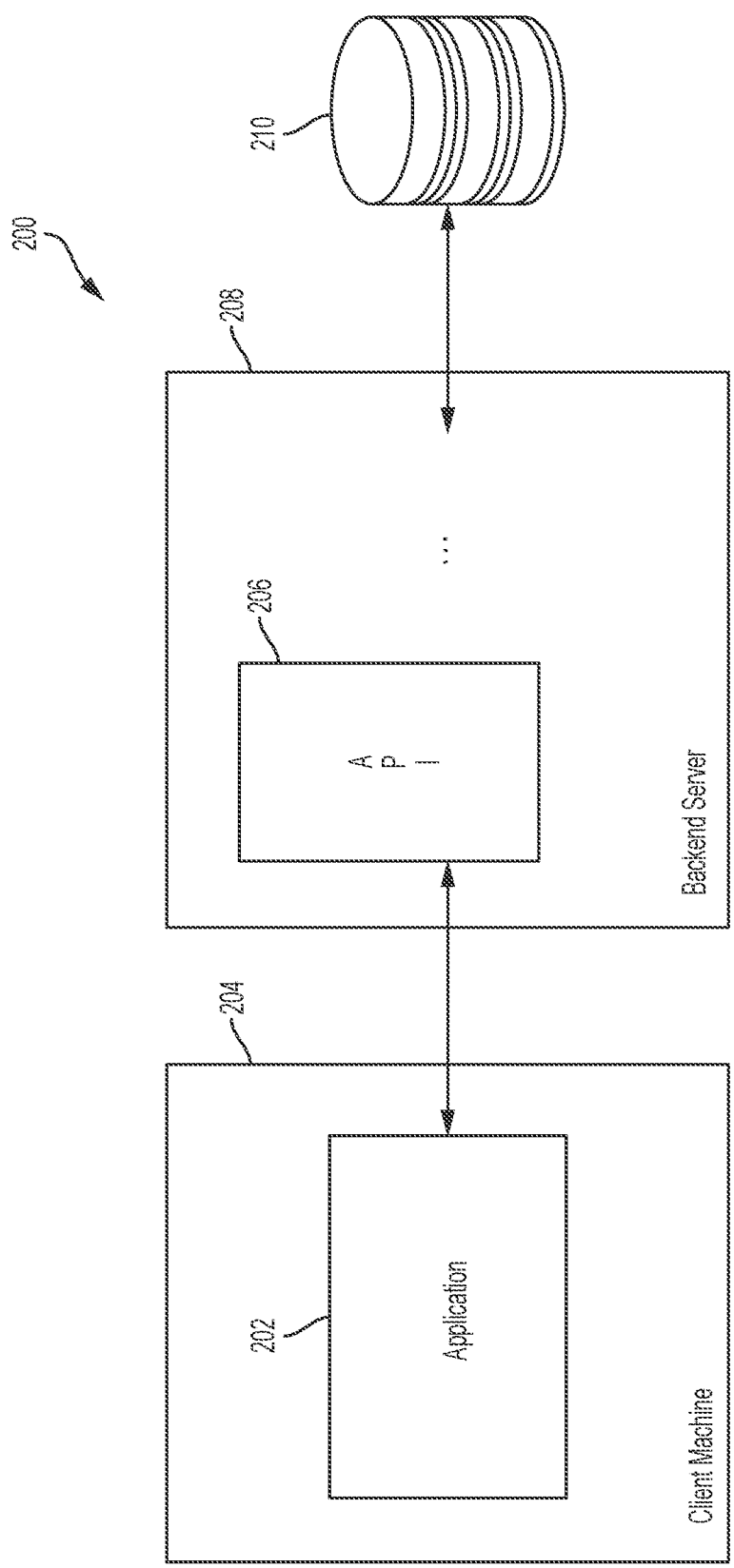
FIG. 2 is another block diagram for the backend as a service architecture, according to one embodiment.

FIG. 2 illustrates a block diagram 200 for an example implementation. In FIG. 2, an application 202 that is executing on a client 204 transmits a request for data to a backend server 208 via API 206. The application 202 is developed and connects to the API for the backend as a service architecture. As such, the developer of application 202 need not write specific code for backend functionality that may instead be access via declarative statements written in the native format of the application being developed. Thus the developer can focus on the frontend code for the application 202. The developer may specify any requests for data in declarative statements, e.g., declarative-type JSON or another suitable declarative type. The backend server 208 services the data request from the application 202 by retrieving the requested data from database 210.

In some embodiments, a back end framework has been architected as a service. The back end framework provides REST API hooks and/or a REST compliant API to access the framework. Various examples and example functionality for the framework are described below. In one example, web or mobile developers can use a thin layer (the service) on top of the well-known MONGODB database (available commercially from MongoDB Inc., New York, N.Y.) to enable the application's main business tier. Various embodiments are constructed to deliver needed functionality to handle service integration, database interactions, etc., and to provide the functionality to handle what the application needs, while also integrating with any other services called by the application for more complex processing.

Figure 3:
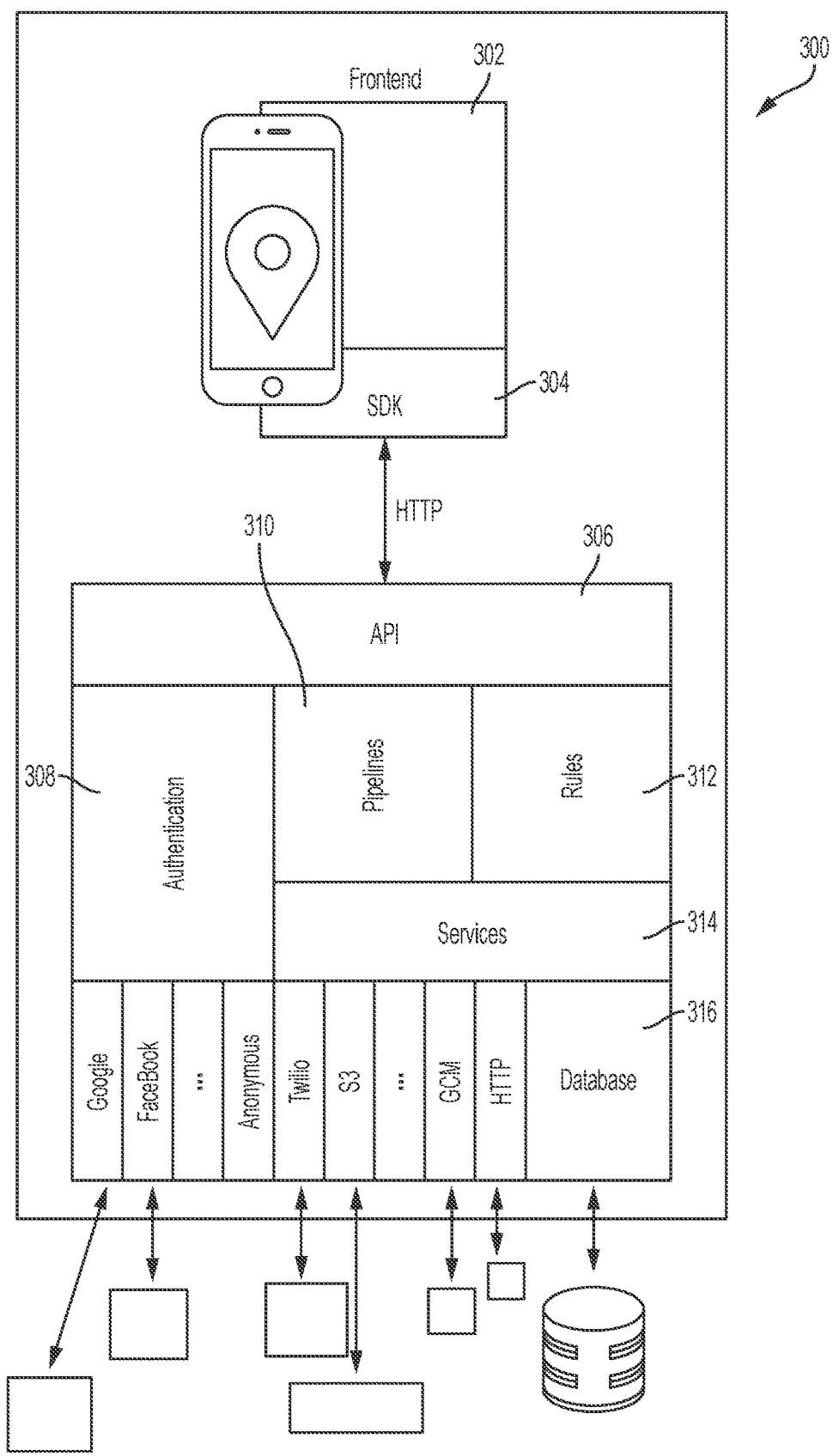
FIG. 3 is yet another block diagram for the backend as a service architecture, according to one embodiment.
Figure 5:
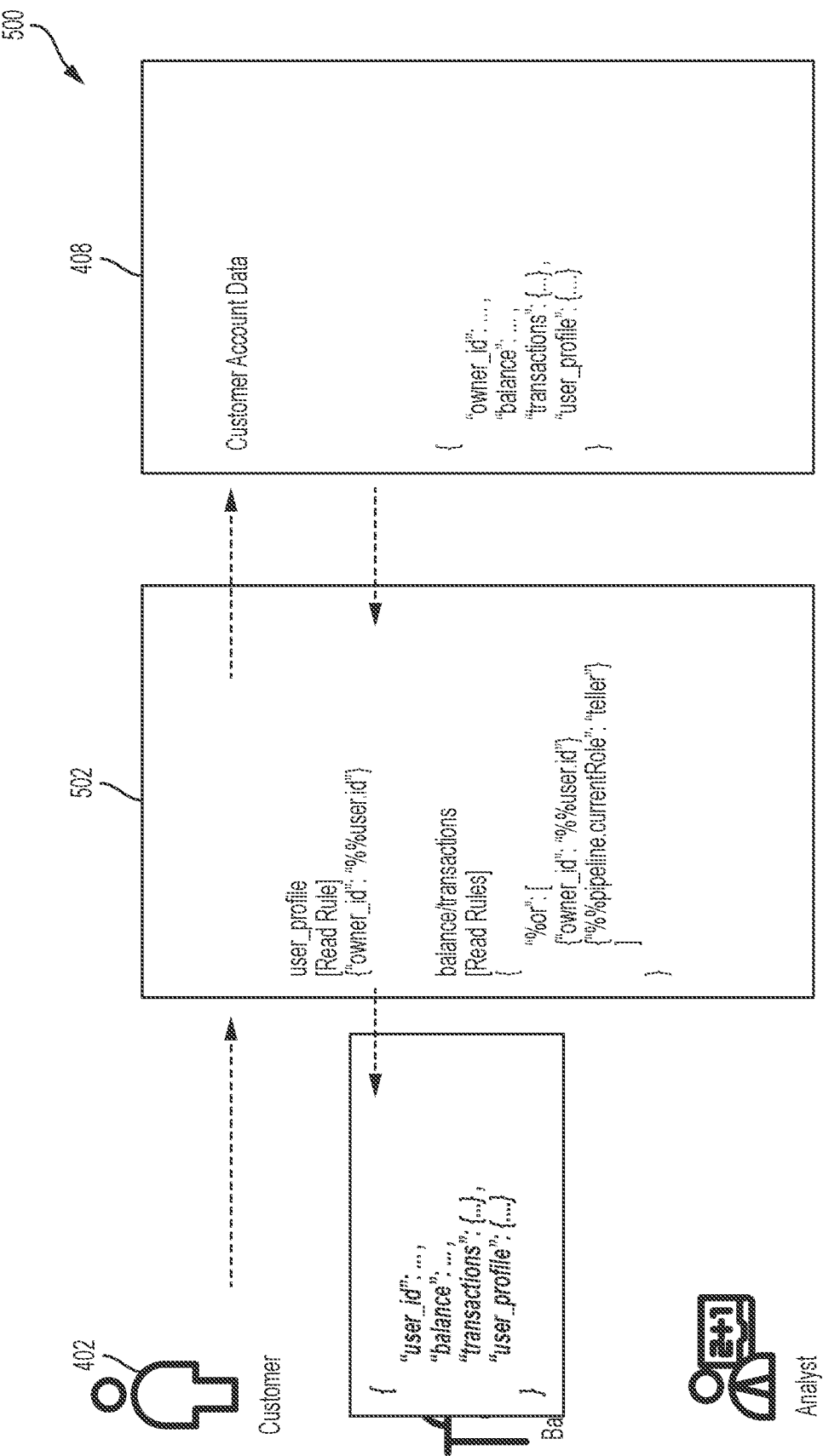
FIG. 5 is a block diagram of an example application requesting data from a remote database, according to one embodiment.
Figure 6:
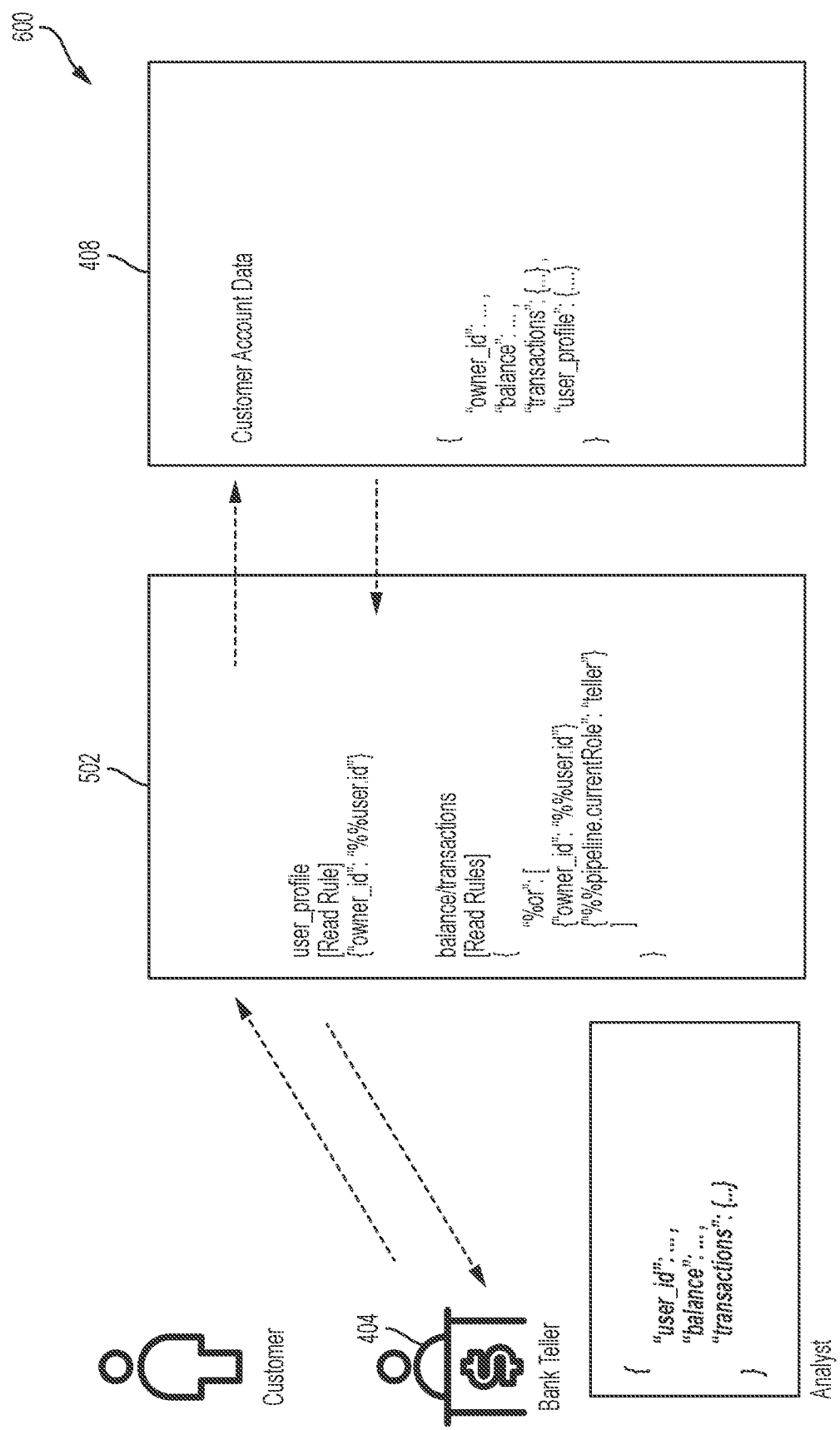
FIG. 6 is another block diagram of an example application requesting data from a remote database, according to one embodiment.
Figure 7:
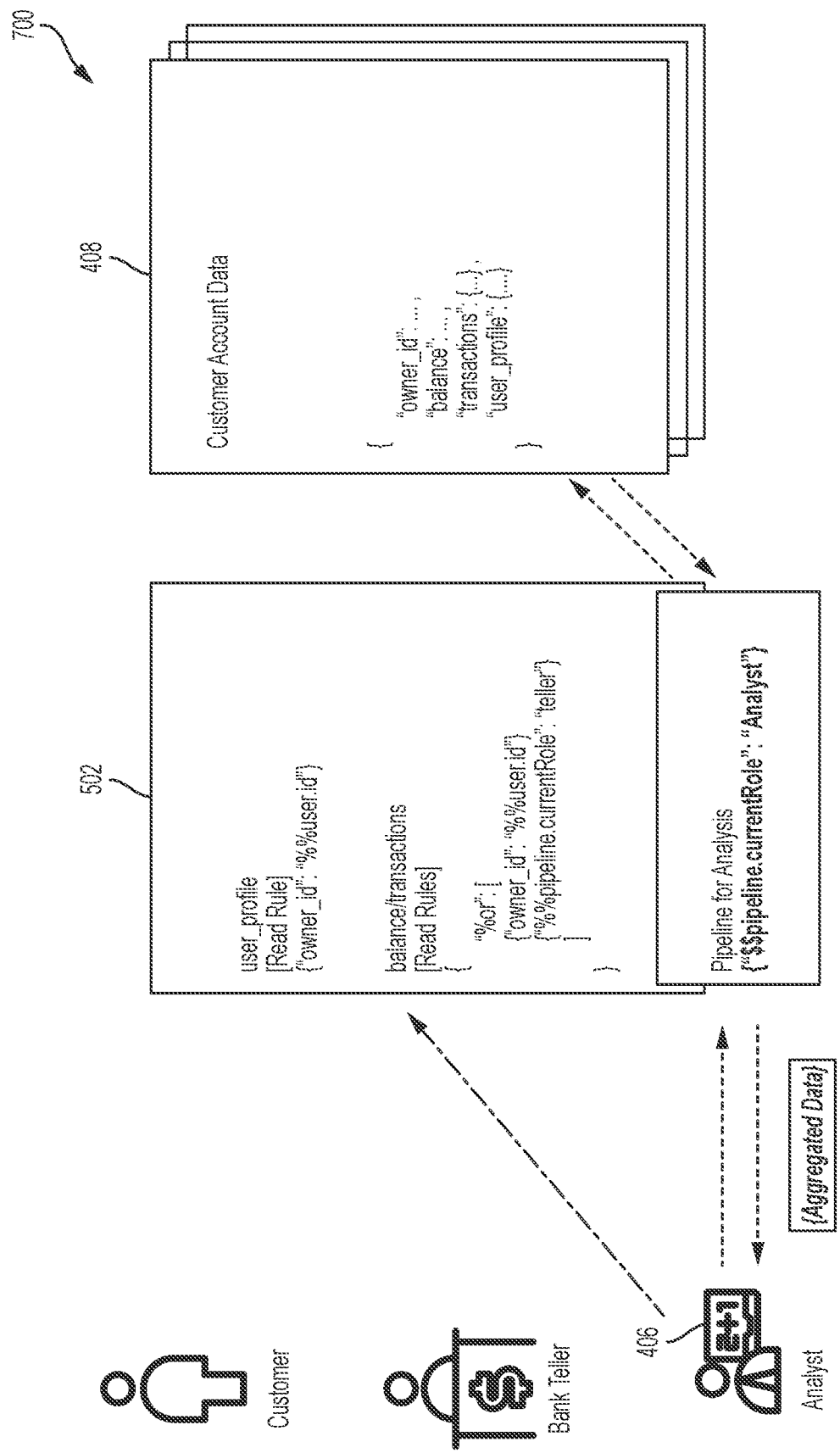
FIG. 7 is yet another block diagram of an example application requesting data from a remote database, according to one embodiment.

FIG. 3 illustrates a block diagram 300 of an example implementation configured to deliver the described functionality. According to one embodiment, a developer implements the frontend of an application 302 using SDK 304 for accessing the backend as a service architecture. The backend server is accessible via the API 306. The backend server provides services such as authentication and access to data from one or more databases 316 and one or more services 314. The backend server may provide authentication services 308 for the application 302, such as GOOGLE, FACEBOOK, anonymous user, or another suitable authentication service. In some embodiments, declarative statements may be coded, e.g., authenticate curr.user( ), to be mapped to specific functionality of any of the preceding authentication services. For example, the declarative statement may be mapped to a function which captures data on curr.user( ) to pass to the authentication service and receive a valid authentication signal in return. The data request may be specified through the use of declarative statements including one or more pipelines 310. The backend server may parse the declarative statements to determine one or more parameters and apply one or more rules 312 to determine whether the application 302 is allowed to make the request and/or allowed to access the requested data. FIGS. 5-7 and related description provide examples of the backend server determining whether the application is allowed to make the request and/or allowed to access the requested data. The backend server may service the data request from the application 302 and deliver the data back to application 302 as appropriate.

Various embodiments enable enhanced interaction with any connected database, and provide, for example, a database administrator greater flexibility and improved database functionality over various conventional approaches. In some embodiments, the back end architecture is specifically architected to handle dynamic schema databases, and can rely on their replication and extensibility strategies while significantly reducing the coding complexity of accessing the same services. For example, a fully exposed REST API enables improved integration between front end applications and the back end services (e.g., a fully exposed MONGODB API is provided to connect to a standardized MONGODB data model) through REST defined commands.

With development of applications, for example, this eliminates the complexity of back end architecture from the development models, improving over known development systems and approaches. Further security design and implementation is greatly simplified over various conventional architectures, as well as enabling flexibility not provided with various conventional implementations (e.g., the back end framework can work with any user defined or customized authentication system (e.g., Oauth, LDAP, etc.) and can in addition enable seamless transitions to new authentication systems—for example, the API can re-map existing authentication calls by the application into a new architecture and handle collection of an additional session information that may need to be passed to the new service). Additionally, the API is configured to handle any front end architecture. In further embodiments, the stateless operation protocol does not impose architectural constraints (beyond using stateless operations) nor limit integrations or enforce constraints imposed by other conventional systems.

According to some embodiments, the back end architecture is configured to support multiple layers of privacy. For example, various embodiments implement a three tier privacy model and assign users, processes, and/or any data consumer to at least one of the three tiers. According to one embodiment, the tiers can loosely be described as: see and/or edit user owned material; see and/or edit some material of other users; and aggregate information (even across data that is not viewable).

The system can be architected to provide flexibility on how rules enforce or enable privacy concerns during execution, enabling differential privacy semantics, providing reasonable default execution parameters (which in some examples can be overridden by user selection or based on rule definition and execution). In further embodiments, the back end architecture is configured to enable code execution when performing rule based tasks.

Figure 4:
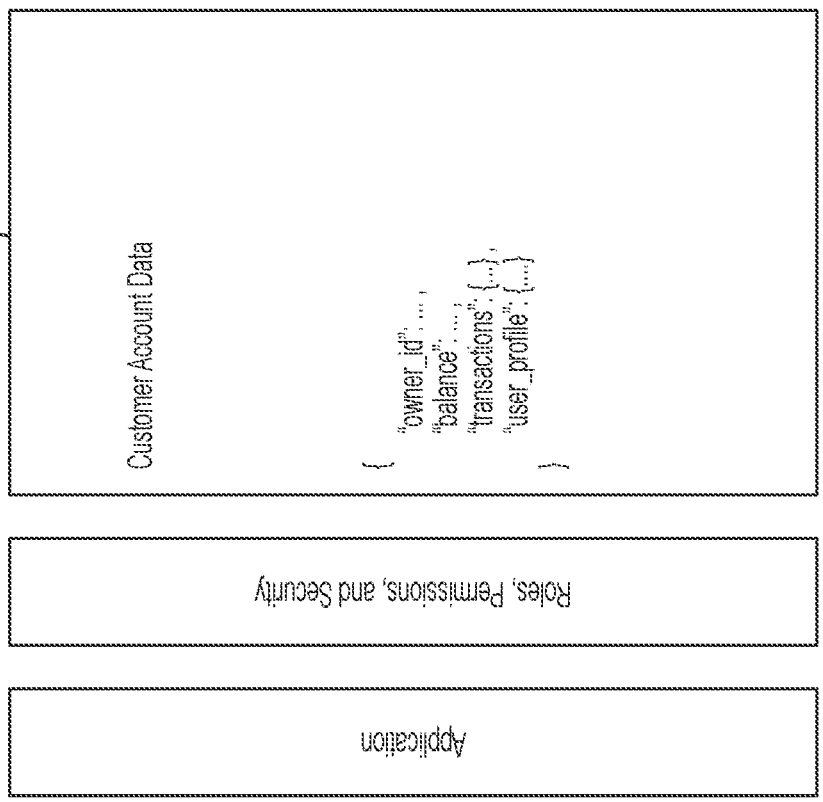
FIG. 4 is a block diagram of an example application implemented using the backend as a service architecture, according to one embodiment.
Figure 4:
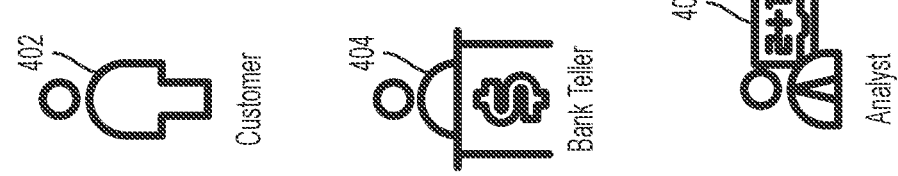

FIG. 4 is a block diagram 400 of an example application, according to one embodiment. In this example, the application is used in a financial institution and needs to provide customer account data from a database 408 to different types of users, such as a customer 402, a teller 404, and an analyst 406. The customer 402 may need to access his or her account and may desire to see and/or edit personal information, such as balance, user profile, address, phone number, etc. The teller 404 may need to lookup transactions relating to customers, but without seeing personal information. The analyst 406 may need to access aggregate information to help understand cash flow or another financial metric. In a conventional system, the developer for the application would need to write code to implement the different roles and related security permissions. However, if the application is implemented using the backend as a service architecture, the developer need not write the backend code and therefore need only focus on the frontend code for the application.

FIGS. 5-7 are block diagrams 500-700 of an example application and data flow implemented using a backend as a service architecture, according to one embodiment. In the example illustrated in FIG. 5, the customer 402 requests data relating to his or her customer account, including owner_id, balance, transactions, and user_profile. The backend server 502 services the request for data from the application. The backend server 502 receives and parses the request. The backend server 502 then applies one or more rules for access to the database 408. For example, if the customer 402 has requested data relating to user_profile, the backend server 502 may apply the read rule, {"owner_id": "%% user.id %%"}. In this example, the read rule allows only information that belongs to the current user to be accessed using the request. The backend server 502 orchestrates retrieving the requested data from the database 408. The backend server 502 aggregates the retrieved data and optionally applies one or more rules for access to the data by the application. Finally, the backend server 502 delivers the data to the customer 402. In this manner, database data can be accessed on the backend for operations that use the underlying data (e.g., to which the user may not have access) and provide complete responses based on the underlying data, all without exposing that data to the unprivileged user. In further examples, the system and/or rules can be further tailored to ensure requested operations are not tailored to elicit information that should not be exposed. In one example, the system validates that aggregation operations include multiple values rather that single data points or combinations with null values that would expose information.

In the example illustrated in FIG. 6, the teller 404 requests data relating to customer transactions, but without seeing customer personal information. The backend server 502 services the request for data from the application. The backend server 502 receives and parses the request. The backend server 502 then applies one or more rules for access to the database 408. In some embodiments, the backend server 502 applies one or more rules, such as a read rule, specified by the database 408. The database 408 may specify a read rule that compares an owner identification of the requested data, e.g., one or more documents, with a user identification associated with the request. The requested document(s) whose owner identification matches the user identification may be returned to the user. The requested document(s) whose owner identification does not match the user identification may be excluded from the document(s) returned to the user (e.g., if no documents match, no results are returned to the user). For example, if the teller 404 has requested data relating to balance or transactions, the backend server 502 may apply the read rule, {"% or": [{"owner_id": "%% user.id %%"}, {"%% pipeline.currentRole": "teller"}]}. Here, the result of executing the pipeline.currentRole expression returns the current role of the user, and the read rule compares whether the current role corresponds to "teller." In this example, the read rule either allows information that belongs to the current user to be accessed using the request, or the read rule allows information accessible in the role of a bank "teller." For example, the read rule may allow the bank teller to access information relating to "transactions" for other users, but the read rule may not allow information relating to "user_profile" for other users, such as passwords. The backend server 502 orchestrates retrieving the requested data from the database 408. The backend server 502 aggregates the retrieved data and optionally applies one or more rules for access to the data by the application. Finally, the backend server 502 delivers the data to the teller 404.

In the example illustrated in FIG. 7, the analyst 406 requests data relating to aggregate customer information to help understand cash flow or another financial metric. The backend server 502 services the request for data from the application. The backend server 502 receives and parses the request. The backend server 502 then applies one or more rules for access to the database 408. In some embodiments, the backend server 502 applies one or more rules, such as a read rule, specified by the database 408. The database 408 may specify a read rule that compares an owner identification of the requested data, e.g., one or more documents, with a user identification associated with the request. The requested document(s) whose owner identification matches the user identification may be returned to the user. The requested document(s) whose owner identification does not match the user identification may be excluded from the document(s) returned to the user (e.g., if no documents match, no results are returned to the user). For example, if the analyst 406 has requested data relating to aggregated data, the backend server 502 may apply the read rule, {"%% pipeline.currentRole": "analyst"}. Here, the result of executing the pipeline.currentRole expression returns the current role of the user, and the read rule compares whether the current role corresponds to "analyst." In this example, the read rule may allow the bank analyst to access aggregate information relating to "transactions" or "balance." The backend server 502 orchestrates retrieving the requested data from the database 408. The backend server 502 aggregates the retrieved data and optionally applies one or more rules for access to the data by the application. Finally, the backend server 502 delivers the data to the analyst 406.

In some embodiments, the backend as a service system can also be configured to use dedicated database hardware (e.g., the MONGODB ATLAS database platform, available commercially from MongoDB Inc., New York, N.Y., enables dedicated hardware to support database instantiations). In further embodiments, the system can also be configured to support quality of service requirements.

According to various embodiments, the back end architecture includes definition of domains in which user, service instances, and applications exist or interact. Applications (e.g., mobile applications) are bound to specific domains (and can, for example, belong to more than one domain). According to some embodiments, the architecture is fully extensible and an administrator, for example, can add any service into the architecture. In one example, a MONGODB database (available commercially from MongoDB Inc., New York, N.Y.) can be integrated into the domain for an application, as well as the known Salesforce service, and/or known GitHub service. In some embodiments, the system is configured to have access to all users bound within a given domain and further the system is configured to enable rules to be defined and executed to provide services for each, any, or combinations of applications.

Figure 8:
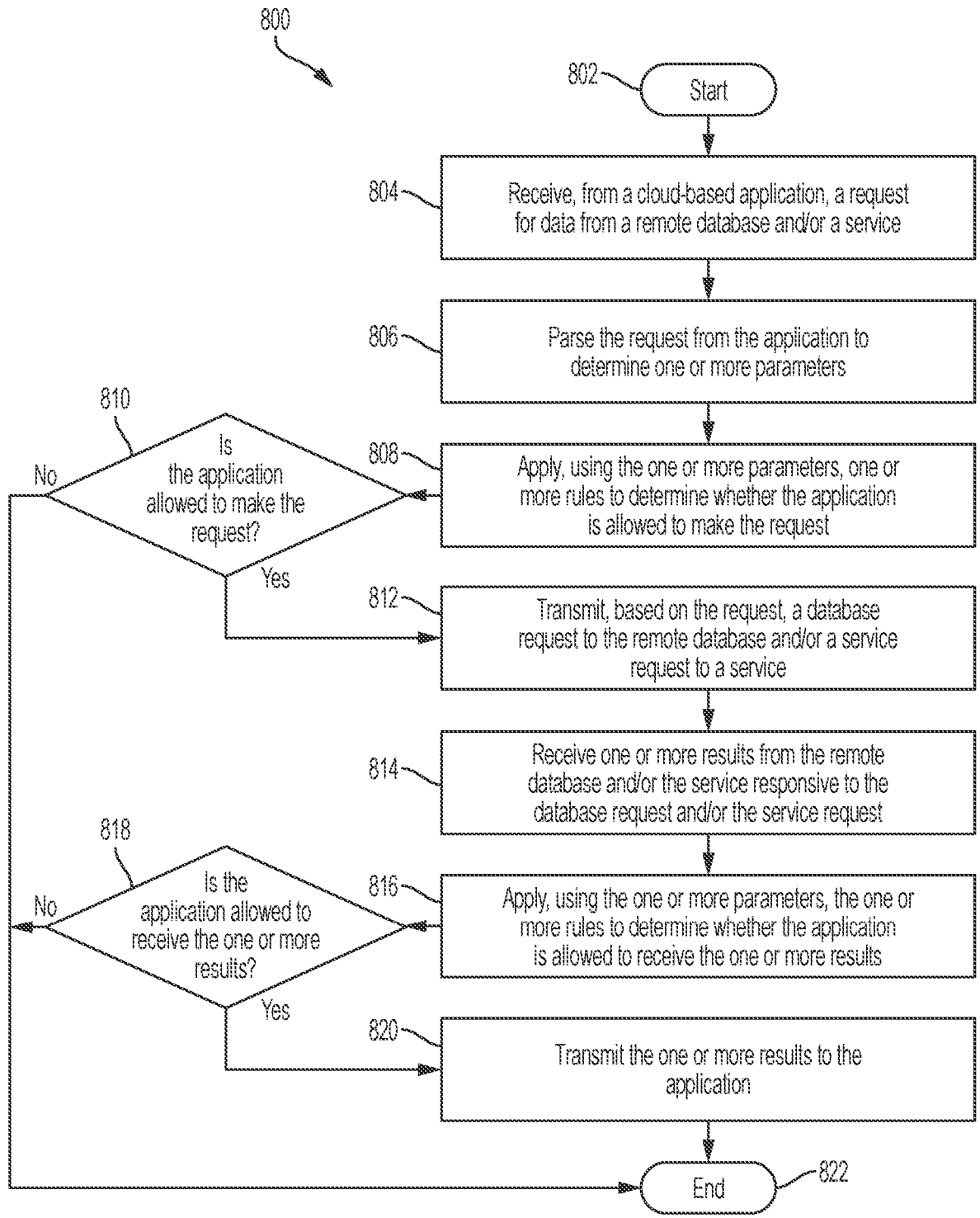
FIG. 8 is an example process flow for a cloud-based resource to service a request for data from an application to a remote database and/or a service, according to one embodiment.

FIG. 8 is an example process flow 800 for a cloud-based resource, such as a backend server, to service a request for data from an application to a remote database and/or a service, according to one embodiment. At step 802, the process starts.

At step 804, the backend server receives a request from a cloud-based application for data from a remote database and/or a service. In some embodiments, the request includes one or more of a create action, a read action, an update action, a delete action, or another suitable action relating to the remote database and/or the service. For example, the request may include a read action from a customer application desiring to access his or her account at a financial institution. In another example, the request may include a create action from a client application to add a comment to a blog page.

At step 806, the backend server parses a declarative statement, from the request, to determine one or more parameters. Following from the example for adding a user's comment to a blog page, the declarative statement may be collection.insertOne ({owner_id: "user", comment: "comment"}). The declarative statement may be parsed to determine the user identification, "user," and content, "comment," directed to the blog page. In some embodiments, parsing the declarative statement from the request includes translating a raw expression for the declarative statement into a general match expression. The raw expression can include the literal text of the declarative statement. The general match expression can include a filter that is applied to the corresponding action. For example, the raw expression, owner_id: "user," may be translated into a match expression corresponding to the create action for adding the comment to the blog page. In some embodiments, translating the raw expression for the declarative statement into the general match expression includes interpolating the raw expression from the request to replace one or more placeholders in the raw expression with corresponding values, converting the interpolated expression into the general match expression, and/or evaluating the general match expression against a value. For example, instead of specifying "user," the declarative statement may refer to a variable, %% user.id, and the declarative statement be interpolated by replacing the variable with the actual value of the %% user.id, e.g., "user."

At step 808, the backend server applies one or more rules, using the one or more parameters, to determine whether the application is allowed to make the request. In some embodiments, the parameters include a user identification. Using the user identification, a rule, e.g., a read rule, may be applied to determine whether a user of the application is authorized to access the remote database and/or the service.

At step 810, the backend server checks whether the application is allowed to make the request. For example, the backend server may apply the read rule to compare an owner identification of the requested data, e.g., one or more documents, with the user identification associated with the request. If the backend server determines that the application is not allowed to make the request, the process proceeds to step 822 and ends. For example, if none of the requested documents have an owner identification matching the user identification associated with the request, no results are returned to the user and the process is terminated. If the backend server determines that the application is allowed to make the request, at step 812, the backend server transmits a database request to the remote database. For example, the backend server may transmit a database request to the remote database for the requested document(s) whose owner identification matches the user identification. In another example, following from the example for adding a user's comment to a blog page, a database request may be generated for transmission to a database for the blog page. The database request may include a request to add the user's comment to the database for the blog page. Additionally or alternatively, a service request based on the request is transmitted to the service.

At step 814, the backend server receives one or more results from the remote database responsive to the database request. For example, a client application may request and receive comments posted by a particular user on the blog page. Additionally or alternatively, one or more results are received from the service responsive to the service request.

At step 816, the backend server applies one or more rules, using the one or more parameters, to determine whether the application is allowed to receive the one or more results. For example, using the user identification specified within the rule, a rule may be applied to determine whether the user of the request is authorized to access the one or more results. In some embodiments, the rules applied to determine whether the application is allowed to receive the results are identical to or overlapping with the rules to determine whether the application is allowed to make the request. In some embodiments, the rules applied to determine whether the application is allowed to receive the results are different from the rules to determine whether the application is allowed to make the request.

At step 818, the backend server checks whether the application is allowed to receive the one or more results. If the backend server determines that the application is not allowed to receive the one or more results, the process proceeds to step 822 and ends. If the backend server determines that the application is allowed to receive the one or more results, at step 820, the one or more results are transmitted to the application. In some embodiments, the database request is transmitted to the remote database, and, based on a response from the remote database, the service request is transmitted to the service. In some embodiments, the service request is transmitted to the service, and, based on a response from the service, the database request is transmitted to the remote database. At step 822, the process ends.

Figure 9:
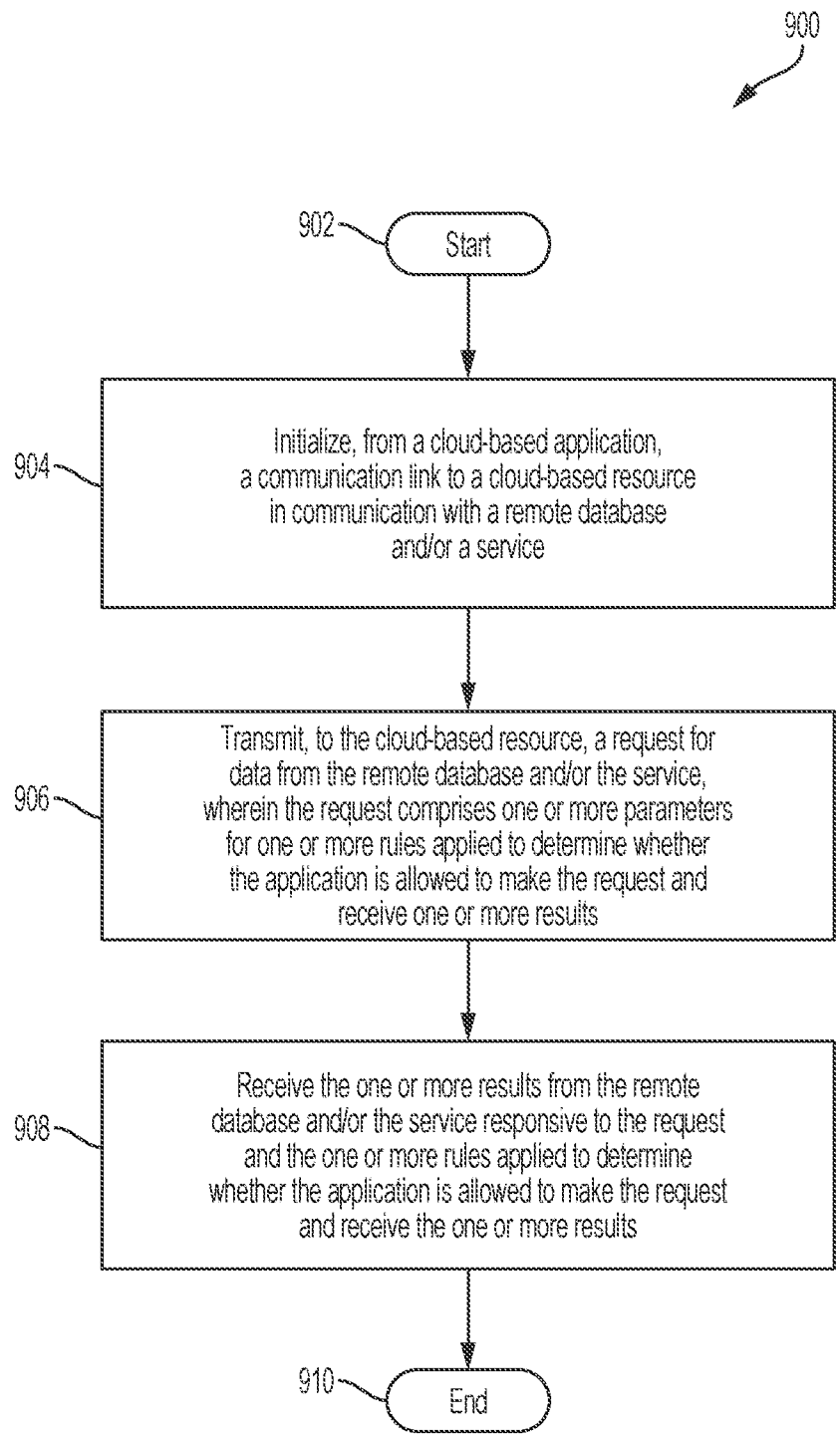
FIG. 9 is an example process flow for a cloud-based application to request data from a remote database and/or a service, according to one embodiment.

FIG. 9 is an example process flow 900 for a cloud-based application to request data from a remote database and/or a service, according to one embodiment. At step 902, the process starts.

At step 904, a communication link is initialized from a cloud-based application to a cloud-based resource in communication with a remote database and/or a service.

At step 906, a request for data from the remote database and/or the service is transmitted to the cloud-based resource. In some embodiments, the request includes one or more of a create action, a read action, an update action, a delete action, or another suitable action relating to the remote database and/or the service. For example, the request may include a read action from a customer application desiring to access his or her account at a financial institution. In another example, the request may include a create action from a client application to add a comment to a blog page.

In some embodiments, the request comprises one or more parameters for one or more rules that are applied to determine whether the application is allowed to make the request and whether the application is allowed to receive one or more results from the remote database and/or the service. Following from the example for a user to add a comment to a blog page, the declarative statement may include collection.insertOne ({owner_id: "user", comment: "comment"}). The declarative statement may be parsed to determine the user identification, "user," and content, "comment," directed to the blog page.

In some embodiments, parsing the declarative statement from the request includes translating a raw expression for the declarative statement into a general match expression. For example, the raw expression, owner_id: "user," may be translated into a match expression corresponding to the create action for adding the comment to the blog page. In some embodiments, translating the raw expression for the declarative statement into the general match expression includes interpolating the raw expression from the request to replace one or more placeholders in the raw expression with corresponding values, converting the interpolated expression into the general match expression, and/or evaluating the general match expression against a value. For example, instead of specifying "user," the declarative statement may refer to a variable, %% user.id, and the declarative statement be interpolated by replacing the variable with the actual value of the %% user.id, e.g., "user."

At step 908, the one or more results are received from the remote database and/or the service responsive to the request and the one or more rules applied to determine whether the application is allowed to make the request and receive the one or more results from the remote database and/or the service. In some embodiments, the parameters include a user identification. Using the user identification, a rule may be applied to determine whether a user of the application is authorized to access the remote database and/or the service. Alternatively or additionally, using the user identification, a rule may be applied to determine whether the user of the request is authorized to access the one or more results. In some embodiments, the rules applied to determine whether the application is allowed to receive the results are identical to or overlapping with the rules to determine whether the application is allowed to make the request. In some embodiments, the rules applied to determine whether the application is allowed to receive the results are different from the rules to determine whether the application is allowed to make the request.

In some embodiments, a portion of the results is received from the remote database responsive to a database request generated based on the request. The remaining portion of the results is received from the service responsive to a service request generated based on the portion of the results received from the remote database.

In some embodiments, a portion of the results is received from the service responsive to a service request generated based on the request. The remaining portion of the results is received from the remote database responsive to a database request generated based on the portion of the results received from the service.

At step 910, the process ends.

In some embodiments, the cloud-based resource allows for direct access to the database platform, but from the perspective of data that an individual user is permitted to access and not the entirety of what is in the database. As such, accessing the database platform via the cloud-based resource avoids the requirement of creating API servers that have to handle the logic of deciding which user can read and update what documents. Additionally, the cloud-based resource may allow for access to third party services, such as GOOGLE CLOUD FUNCTIONS and AMAZON WEB SERVICES, along with access to the databases. The developer may specify the access rules in a declarative fashion using pipelines, such as the pipelines illustrated in the following example:

```
[
  {
    "service": "mongodb-atlas",
    "action": "find",
    "args": {
      "database": "myApp",
      "collection": "friends",
      "query": {
        "name": "Bob",
        "phoneNumber": { "$exists": true }
      }
    }
  },
  {
    "service": "twilio",
    "action": "send",
    "args": {
      "from": "%%values.our_number",
      "to": "%%vars.phoneNumber",
      "body": "Hey!"
    },
    "let": {
      "phoneNumber": "%%item.phoneNumber"
    }
  }
]
```

In this example, the application can find all documents in a friends collection where the person's name is Bob and they have a phone number. Then for each of those documents, the application can send a text on TWILIO to that phone number. The backend server receiving these requests from the pipeline may execute rules for both stages individually against the arguments used. That is, the backend server may execute the rules to ensure that the application accesses only friends it is allowed to, and that the application only sends SMS messages to phone numbers it is permitted to.

In some embodiments, the backend server's rules do not override the read and write access (i.e., authorization) that may have been set up separately in the database. That is, the backend server's rules determine whether the fields are readable or writable, not whether the application has authorization to read or write to the particular database.

In some embodiments, a backend server receives a request from a cloud-based application to access data from a remote database. The backend server determines one or more fields to be accessed based on the request. For example, the backend server may receive a request for customer account data as illustrated in FIG. 4. The request may include requests for data relating to one or more fields, such as owner_id, balance, transactions, and user_profile. The backend server applies a set of rules to determine whether the application is allowed to access the fields. Examples of such rules are illustrated with respect to FIGS. 5-7. For example, the backend server may apply a read rule such that the backend server allows only information that belongs to the current user, such as user_profile, to be accessed using the request. If it is determined that the application is allowed to access the fields, the backend server transmits a database request to the remote database based on the request and the fields. Responsive to the database request, the backend server may receive one or more results from the database. However, a server associated with the database or another server, such as the backend server, may apply another set of rules to determine whether the application is allowed to access the results from the remote database. For example, the database server may apply a read rule such that users whose customer account data is locked may not access their user_profile. The data may be locked due to maintenance, suspected fraudulent activity, or another suitable reason. The application may be allowed to access the customer account data if the current user's data is not locked. If the application is allowed to access the results from the remote database, the received results are subsequently transmitted to the application that made the request.

In the embodiment described above, the backend server can validate a first level of authorization, which is followed by another level of authorization at the database. For example, the backend server may determine a state of the fields being accessed, e.g., whether the fields are writable or readable. In some examples, the backend server provides this architecture to handle/mitigate the access issues associated with direct database access. Indeed the backend system at the first level of validation is only concerned with whether a field is accessible, not whether the application or individual user has permissions to access the specific field. In this manner, the application/user level validation can be executed before, after, and/or in some examples independently from permission type authorization.

Further examples of the above described rules for the database server are provided below.

In some embodiments, the database has the following read rule:

```
{
    "owner_id": "%%user.id"
}
```

With this rule, read operations can access all fields in a document if the document contains an owner_id field whose value equals the user ID (%% user.id) of the client issuing the read. If the owner_id field in the document does not equal the client user id, no field in the document is readable. For example, for each data request the database receives, the database server may check the owner_id for the request and only return requested information whose owner_id field equals the received owner_id.

In some embodiments, the database has the following write rule:

```
{
    "%or"; [
```

-continued

```
        { "%%prevRoot.owner_id": "%%user.id" },
        { "%%prevRoot": { "%exists": false } }
    ]
}
```

The write rule specifies that the fields in a document are writable if either:

(1) The write operation modifies a document where the value of owner_id previous to the write operation (%% prevRoot.owner_id) equaled the user ID (%% user.id) of the client issuing the write. An example of this kind of write operation is a client modifying a document that it previously inserted.

(2) The write operation modifies a document where there was no document (% exists) previous to the write operation (%% prevRoot). An example of this kind of write operation is an insert of a new document.

In some embodiments, the database has the following validation rule:

"%% user.id"

The validation rule requires that the value of owner_id equals the user ID (%% user.id) of the client issuing write. That is, the backend server fails write operations that violate this rule.

In some embodiments, the database has the following filter rule:

When: {"%% true": true}

Match Expression: {"owner_id": "%% user.id" }

This filter indicates that when %% true equals true (i.e. always), apply the following filter {"owner_id": "%% user.id" } to the read and write operations. This filter is in addition to the query predicates for read and write operations. In other embodiments, the filer can specify additional or different criteria, for example, where the application developer provides fine tune control over command execution. In other embodiments, the backend architecture can provide different filters to apply to various operations.

Example Implementation Case

According to one embodiment, a social product family distribution includes three product elements: Chatter, Assist, and Whiteboard. When a user registers for Chatter, the system is configured to automatically integrate the user into the Blaster ecosystem. For example, the user's information is built into Chatter, Assist, and Whiteboard, regardless of whether or not they have used all of the services. The system can be further integrated with external services. For example, the system can enable users to log in with a GitHub and User/Password across all the products.

To extend the example, a separate product family called Corp consists of two products: Bills and Charts. In response to a registration action by the user, the system is configured to allow the same user access to the other product. In addition, even with registration under a separate product family, the system is configured to maintain and connect authentication credentials for the user in one product family and provide the same access to another product family using the same credential.

In some embodiments, the internal system may manage both of these product families but since various clients and users create a lot of fake accounts (that should never leak out into production systems or environments), the system is configured to still consider users separate entities over the different product families. In some examples, users are configured with their own profile info, while the system enables the users to log in with the same information as they would publicly.

Various architectures can support the back end as a service embodiments, including implementation of multi-tenancy and user centralization to achieve single credential, multiple user profiles. Using the example discussed above, the system is configured to manage shared users from Blaster and Corp and allow them to exist in their own separate "domains" for the public version of the products and the internal version of the products.

According to some embodiments, applications are configured to determine acceptable authentication mechanisms. For example, a notion of "sessions" can be implemented at the domain level where a session details the active authentication mechanisms that have been validated.

According to further embodiments, various authentication providers are supported by the system. For example, an authentication provider handles authentication for its own users and provides authentication services for external system (e.g., provides an identity claiming their user is who validated for who they say they are). Identity in such a setting includes a unique, authentication provider specific document or certificate with an assertion and validation information on who a user is. In various examples, multiply-linked identities can refer to a single user. According to one embodiment, the system is configured to support 1-to-many relationship of user to identity. The system can be configured to support a number of fields associated with users and identities. In one example, the system encodes fields for userId—ObjectId—unique id of user, identities—document—map of provider to identity, and data—document—map of arbitrary fields accessible to other services.

Various embodiments of the system enable some authentication providers by default. For example, the system can support any one, more, or combination of the following providers by default, including FACEBOOK, GITHUB, MONGODB users, TWITTER, GOOGLE, SAML, and OAUTH. In some embodiments, the authentication providers can provide custom tokens that a user can reference or pass along to the system for verification.

```
Identity Code Examples
{
  "id": {"$oid": "507f191e810c19729de860ea"},
  "domain": "default",
  "identities": [
    {
      "provider": "github",
      "userId": "871746",
      "access_token": "e72e16c7e42f292c6912e7710c838347ae178b4a",
      "scope": ["user", "gist"]
    },
    {
      "provider": "userpassword",
      "userID": "1094010496"
    }
  ],
  "data": {
    "name": "Jay Madsen",
    "email": "jay.madsen@wescale.com"
  }
}
{
  "id": {"$oid": "507f191e810c19729de860ea"},
  "domain": "internal",
  "identities": [
    {
      "provider": "github",
      "userId": "871746",
```

-continued

```
      "access_token": "e72e16c7e42f292c6912e7710c838347ae178b4a",
      "scope": ["user", "gist"]
    },
    {
      "provider": "userpassword",
      "userID": "1094010496"
    }
  ],
  "data": {
    "name": "Jay Mad",
    "email": "jay.madsen@wescale.com",
    "debug": true
  }
}
```

Various embodiments can include predictable document size, unique index on domain and identity, looking at a user is executed by the system in the context of that domain, and supporting simple deployment cases by the system can be resolved based on "defaulting" to the default domain.

In some implementations, services handled by the system are configured to register resources and register stages bound to that resource. For example, resource execution is defined in the form of a path (e.g., static—/foo/bar and/or dynamic—/baz/{firstName}). In some embodiments, staged based execution can occur on the system. For example, actions executed by the system can be invoked with context in the form of arguments to methods used in each pipeline stage, a result producing action can be configured to provide either an iterator, collection, or singular result, and an action is submitted to the execution pipeline.

In some implementations, available services can be discovered by users/admin/system requests. For example, similar to man pages queries can be executed to show what methods are available are and how they can be called on the system. Other examples include hidden methods that must be known to execute.

According to some embodiments, services can be defined through code, made pluggable, defined through UI selections to establish the underlying code, and can also be defined as a proxy. For example: POST/foo/bar=>PUT https://api.com/foo/baz. Other embodiments, provide a general service that accepts a configuration via UI selection. In one example, the system executes HTTP to interact with the service, however the HTTP can be invoked as a transport that is loosely coupled.

Example Execution System Constraints

Various embodiments can incorporate any one, more, or any combination of the following features:
- no implementation for cursors—users paginate data as needed
- scalable
- RESTful (optional)
- use HTTP/S as a transport
- default authentication providers
- easy custom authentication implementation for custom auth (e.g., write your own or provide a common mechanism to support auth (a la firebase custom JWT))
- pluggable, extensible, and flexible while facilitating set up for simple use cases
- single app/use case very easy without having to worry about all the knobs (e.g., use default settings to cover single app/use case)

According to some embodiments, back end service functions can be made available as part of a cloud based service offering. Commonly-owned U.S. patent application Ser. No. 15/627,502, filed Jun. 20, 2017, and entitled "SYSTEMS AND METHODS FOR MANAGING DISTRIBUTED DATABASE DEPLOYMENTS," describes examples options for cloud service offerings, and/or automated functions, the disclosure of which is incorporated herein as an instant part of this specification.

Example Execution Rules and Custom Actions

It is realized that certain database actions, including aggregation, are difficult/non-trivial to express rules for and can vary in ranges of complexity. Accordingly, various aspects provide for user interfaces that simplify classes of actions into selections and enable for example, an application owner to define these kinds of operations and build their own rule for it, then they could safely allow a user to execute these types of actions.

According to various aspects, a database administrator can define a rules framework within their database providing a back end as a service architecture.

Various embodiments provide one or more and combinations of the following:
  Reduce scope of actions available when invoking a pipeline as a user
  specify arguments
  allow or deny the custom action based on an expression
  reuse document ABAC (Attribute-Based Access Control) for the output According to one embodiment, the architecture is configured (e.g., command syntax specified) to support custom actions that include:
  Custom actions are first class citizens that have identity (name)
  Arguments are named and are optionally validated by the system
  The logic of an action is a defined pipeline that has access to user scoped and action scoped actions
    The pipeline can use defined arguments
    Pipelines are execution sequences that pass result of prior operations into subsequent operations in the pipeline
  A rule is bound to the custom action that specifies when the action is valid to be executed and an optional document validation for ABAC.

In various examples, pipelines are configured to provide a scripted architecture for defining custom rules, actions, triggers, and/or limitation on execution. In some implementations, the following features and/or combinations of features are provided:
  Pipeline contents must be interpolated with arguments
    Interpolate each arguments section per stage
    Pipeline execution can be broken up into stages of execution
  In some implementations, a pipeline with arguments that control execution parameters of the pipeline can be used to morph pipeline variables into a dynamic execution framework. Such an execution pipeline may allow for reusing some pieces of logic in multiple executions of a particular read rule. For example, a pipeline may include executing a read rule and receiving a result regarding whether a current role of the user is "teller" or "analyst." The computation of this result may be a complicated operation. By using the execution pipeline, the result of the current role operation may be reused for other subsequent operations in the pipeline. As such, the system need not perform the complicated operation to re-compute the current role each time a subsequent operation is to be performed in the execution pipeline.

In some implementations, "custom actions" are basic operations to manipulate data that can be used to build more complicated execution pipelines. According to various embodiments, these "custom actions" may be available at the app level and may use built in variable names like literal, match, project, null, expr, and objectToArray. In various examples, the database and/or the backend server can provide a service where these variable names are reserved for use in code referencing these "custom actions."

In one embodiment, if a user wants to open up data in an existing hosted database (e.g., the MONGODB ATLAS database platform, available commercially from MongoDB Inc., New York, N.Y.), then system enables the user to define security rules to selectively expose portions of the data to other applications through the back end as a service API. For example, through declarative configuration, users are able to create sophisticated operations on the system—where the system is configured to accept and execute multiple services within pipelines. According to one embodiment, the system is configured to execute pipelines in a series of stages where each pipeline passes data through the series of service stages, and each stage acts on the data before passing its results on to the next.

Example Design

Embodiment 1

```
type CustomAction struct {
    Name            string
    Pipeline        PipelineRawInput
    Args            [ ]string
    Rule            CustomActionRule
}
type CustomActionRule struct {
    CanRun          db.MarshalD
    Document        map[string]*FieldRule
}
```

Embodiment 2

```
type CustomAction struct {
    Name        string
    Pipeline    PipelineSource
    Rule        CustomActionRule
}
type CustomActionRule struct {
    CanRun      db.MarshalD // access to action.pipeline.args
    Document    map[string]*FieldRule
}
type PipelineSource struct {
    Pipeline    PipelineRawInput
    Output      PipelineOutput // we would set this to array
    Args        [ ]string
}
```

Example Implementation

Some embodiments incorporate the functionality and architecture of embodiment 1 above. This approach provides for a standalone implementation and that is separated from variables. Embodiment 1 has the advantage of developing the custom action framework independently from other possibly changing features. In some examples, usability of the architecture of embodiment 1 can be simplified, for example, UI interactions are simplified for user input needed to define custom actions.

In some embodiments, the system enables users to select in the UI which architecture to employ (e.g., embodiment 1 or 2 above, among other options), and in others, once a user specifies a variable or expression the system can select an architecture to support the user's choice.

SOME EXAMPLES

```
Custom Action
{
   "name": "do_agg",
   "pipeline": [
      {
         "action": "aggregate",
         "args": {
            "database": "db",
            "collection": "coll",
            "pipeline": [
               {
                  "$match":
                  {
                     "ownerId": "$args.me",
                     "_id": "$args.target"
                  }
               }
            ]
         }
      }
   ],
   "args": ["me", "target"],
   "rule": {
      "canRun": {
         "$auth": {"$ne": null},
         "$args.me": "$auth",
         "$args.me": {"$ne": "$args.target"}},
      "document": {
         "one": {
            "visible": {"$doc._id": {"$type": "objectid"}}
         }
         "two": { }
      }
   }
}
Execution
[
   {"action": "do_agg", "args": {"me": client.auth.id( ),
   "target": ObjectId("123")}}
]
```

Example Rule Architecture
  Example Rule Structure (Logical)
namespace: DB and Collection
visible: expression->bool; queried document available
change: expression->bool; queried document available
validate: expression->bool; queried and updated document available
fields:
  <fieldName>
    visible: expression->bool; queried value of root[<FieldName>] available
    change: expression->bool; queried value of root[<FieldName>] available
    validate: expression->bool; old/new value of root[<FieldName>] available
    fields: same as top-level fields; implies <FieldName> value is a document
    elements: implies <FieldName> is an array
      visible: expression->bool; queried element value available
      change: expression->bool; queried element value available
      validate: expression->bool; old/new element value available Visibility Semantics

Implementation Example 1—Visibility at Deeper Levels Overrides Shallower Levels If no setting for visible is specified for a field, setting defaults to true.
If visible is false, then false becomes the default for all fields nested below the field.
If visible is true, then the field becomes visible, even if the parent indicates that it's false.

EXAMPLES

| | |
|---|---|
| f1:<br>  visible: false<br>  fields:<br>    f2: ~<br>    f3: ~ | { }<br>f1 redacted entirely. |
| f1:<br>  visible: false<br>  fields:<br>    f2:<br>      show: true<br>    f3: ~ | {"f1": {"f2": { } } }<br>f1 kept, but f3 is redacted. |
| f1:<br>  visible: true<br>  fields:<br>    f2:<br>      show: false | {"f1": {"f3":{ } } }<br>f2 is redacted. f3 inherited "visible:true" from f1. |
| f1:<br>  fields:<br>    f2:<br>      show: false | Same as previous. f1 defaulted to visible:true. |

Implementation Example 2—Field

The highest level where visible is set to true or false (i.e. not null) applies to all children of that field.
If visible is true, then all substructures of the field become visible.
If visible is false, then the entire document structure underneath that field is redacted.

EXAMPLES

| | |
|---|---|
| f1:<br>  visible: false<br>  fields:<br>    f2: ~<br>    f3: ~ | { }<br>f1 redacted entirely. |
| f1:<br>  visible: false<br>  fields:<br>    f2: ~<br>    f3: ~ | { }<br>f1 redacted entirely. |
| f1:<br>  visible: true<br>  fields:<br>    f2:<br>      visible: false | {"f1": {"f3":{ ... } } }<br>f2 is redacted. f3 inherited "visible:true" from f1. |
| f1:<br>  fields:<br>    f2:<br>      visible: false | Same as previous. |

Example System Implementations

Various aspects and functions described herein, in accord with aspects of the present invention, may be implemented as hardware, software, or a combination of hardware and software on one or more computer systems. There are many examples of computer systems currently in use. Some examples include, among others, network appliances, personal computers, workstations, mainframes, networked clients, servers, media servers, application servers, database servers, web servers, and virtual servers. Other examples of computer systems may include mobile computing devices, such as cellular phones and personal digital assistants, and network equipment, such as load balancers, routers and switches. Additionally, aspects in accord with the present invention may be located on a single computer system or may be distributed among one or more computer systems connected to one or more communication networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system placements and components using a variety of hardware and software configurations, and the implementation is not limited to any particular distributed architecture, network, or communication protocol. Furthermore, aspects in accord with the present invention may be implemented as specially-programmed hardware and/or software.

Figure 10:
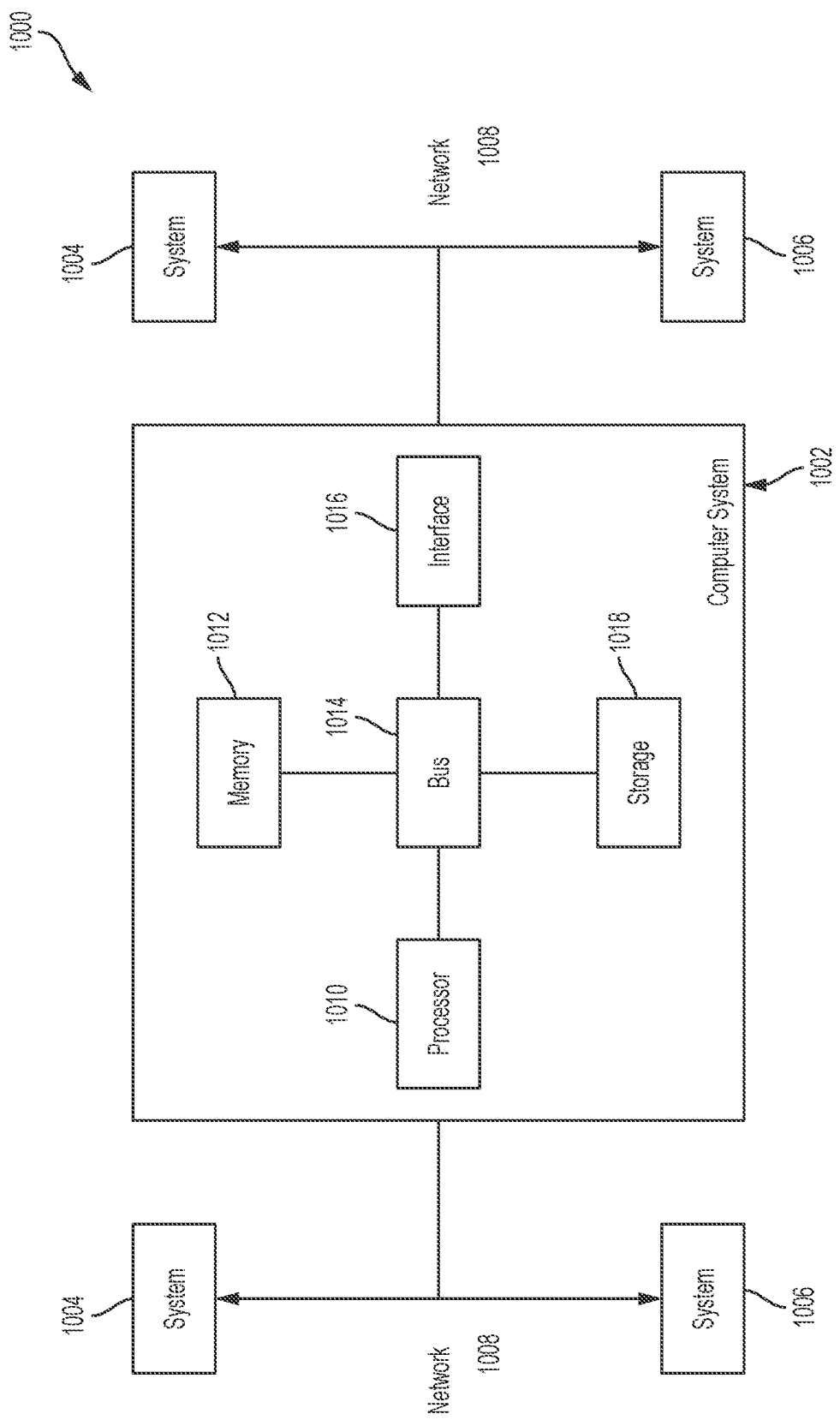
FIG. 10 is a block diagram of a computer system on which various embodiments of the invention may be practiced.

FIG. 10 shows a block diagram of a distributed computer system 1000, in which various aspects and functions in accord with the present invention may be practiced. The distributed computer system 1000 may include one more computer systems. For example, as illustrated, the distributed computer system 1000 includes three computer systems 1002, 1004 and 1006. As shown, the computer systems 1002, 1004 and 1006 are interconnected by, and may exchange data through, a communication network 1008. The network 1008 may include any communication network through which computer systems may exchange data. To exchange data via the network 1008, the computer systems 1002, 1004, and 1006 and the network 1008 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA HOP, RMI, DCOM and Web Services.

Computer systems 1002, 1004 and 1006 may include mobile devices such as cellular telephones. The communication network may further employ one or more mobile access technologies including 2nd (2G), 3rd (3G), 4th (4G or LTE) generation radio access for cellular systems, WLAN, Wireless Router (WR) mesh, and other communication technologies. Access technologies such as 2G, 3G, 4G and LTE and future access networks may enable wide area coverage for mobile devices. For example, the network may enable a radio connection through a radio network access such as Global System for Mobil communication (GSM), General Packet Radio Services (GPRS), Enhanced Data GSM Environment (EDGE), Wideband Code Division Multiple Access (WCDMA), among other communication standards. Network may include any wireless communication mechanism by which information may travel between the devices 1004 and other computing devices in the network.

To ensure data transfer is secure, the computer systems 1002, 1004 and 1006 may transmit data via the network 1008 using a variety of security measures including TSL, SSL or VPN, among other security techniques. While the distributed computer system 1000 illustrates three networked computer systems, the distributed computer system 1000 may include any number of computer systems, networked using any medium and communication protocol.

Various aspects and functions in accord with the present invention may be implemented as specialized hardware or software executing in one or more computer systems including the computer system 1002 shown in FIG. 10. As depicted, the computer system 1002 includes a processor 1010, a memory 1012, a bus 1014, an interface 1016 and a storage system 1018. The processor 1010, which may include one or more microprocessors or other types of controllers, can perform a series of instructions that manipulate data. The processor 1010 may be a well-known, commercially available processor such as an Intel Pentium, Intel Atom, ARM Processor, Motorola PowerPC, SGI MIPS, Sun UltraSPARC, or Hewlett-Packard PA-RISC processor, or may be any other type of processor or controller as many other processors and controllers are available. As shown, the processor 1010 is connected to other system placements, including a memory 1012, by the bus 1014.

The memory 1012 may be used for storing programs and data during operation of the computer system 1002. Thus, the memory 1012 may be a relatively high performance, volatile, random access memory such as a dynamic random access memory (DRAM) or static memory (SRAM). However, the memory 1012 may include any device for storing data, such as a disk drive or other non-volatile storage device, such as flash memory or phase-change memory (PCM). Various embodiments in accord with the present invention can organize the memory 1012 into particularized and, in some cases, unique structures to perform the aspects and functions disclosed herein.

Components of the computer system 1002 may be coupled by an interconnection element such as the bus 1014. The bus 1014 may include one or more physical busses (for example, busses between components that are integrated within a same machine), and may include any communication coupling between system placements including specialized or standard computing bus technologies such as IDE, SCSI, PCI and InfiniBand. Thus, the bus 1014 enables communications (for example, data and instructions) to be exchanged between system components of the computer system 1002.

Computer system 1002 also includes one or more interfaces 1016 such as input devices, output devices and combination input/output devices. The interface devices 1016 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 1016 allow the computer system 1002 to exchange information and communicate with external entities, such as users and other systems.

Storage system 1018 may include a computer-readable and computer-writeable nonvolatile storage medium in which instructions are stored that define a program to be executed by the processor. The storage system 1018 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. A medium that can be used with various embodiments may include, for example, optical disk, magnetic disk or flash memory, among others. In operation, the processor 1010 or some other controller may cause data to be read from the non-volatile recording medium into another memory, such as the memory 1012, that allows for faster access to the information by the processor 1010 than does the storage medium included in the storage system 1018. The memory may be located in the storage system 1018 or in the memory 1012. The processor 1010 may manipulate the data within the memory 1012, and then copy the data to the medium associated with the storage system 1018 after processing is completed. A variety of components may manage data movement between the medium and the memory 1012, and the invention is not limited thereto.

Further, the invention is not limited to a particular memory system or storage system. Although the computer system 1002 is shown by way of example as one type of computer system upon which various aspects and functions in accord with the present invention may be practiced, aspects of the invention are not limited to being implemented on the computer system. Various aspects and functions in accord with the present invention may be practiced on one or more computers having different architectures or components than that shown in FIG. 10. For instance, the computer system 1002 may include specially-programmed, special-purpose hardware, such as for example, an application-specific integrated circuit (ASIC) tailored to perform a particular operation disclosed herein. Another embodiment may perform the same function using several general-purpose computing devices running MAC OS System X with Motorola PowerPC processors and several specialized computing devices running proprietary hardware and operating systems.

The computer system 1002 may include an operating system that manages at least a portion of the hardware placements included in computer system 1002. A processor or controller, such as processor 710, may execute an operating system which may be, among others, a Windows-based operating system (for example, Windows NT, Windows 2000/ME, Windows XP, Windows 7, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

The processor and operating system together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, functions in accord with aspects of the present invention may be implemented using an object-oriented programming language, such as JAVA, C++, or C# (C-Sharp), among others. Other object-oriented programming languages may also be used. Alternatively, procedural, scripting, or logical programming languages may be used.

Additionally, various functions in accord with aspects of the present invention may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed placements, or any combination thereof. For example, a web page may be implemented using HTML while a data object called from within the web page may be written in C++. Thus, the invention is not limited to a specific programming language and any suitable programming language could also be used.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A cloud-based resource for servicing a request from a cloud-based application to access data from a remote database, comprising:

a processor configured to:
receive, from a cloud-based application, a request to access data from a remote database, the remote database including a plurality of documents;
determine, from the request, a user identification and one or more fields to be accessed for a read or write operation;
apply a first set of rules to determine whether the cloud-based application is allowed to access the one or more fields based on whether a user role associated with the user identification is authorized to request the read or write operation;
identify a first document subset including a subset of documents of the plurality of documents;
transmit, based on the request and the one or more fields, a database request to the remote database;
access, at the cloud-based resource, one or more results from the remote database responsive to the database request;
apply a second set of rules;
identify a second document subset including a subset of documents of the first document subset; and
transmit, based on a determination according to the first set of rules that cloud-based application is allowed to access the one or more fields based on the user role and based on an identification according to the second set of rules, the one or more results to the cloud-based application, the one or more results including the second document subset,
wherein transmitting the one or more results including the second document subset comprises providing, responsive to a request associated with an unprivileged user role, a response, wherein the response includes an output prepared using underlying data and the response does not expose the underlying data.

2. The cloud-based resource of claim 1, wherein the request includes a declarative statement to determine one or more parameters for the first set of rules and/or the second set of rules.

3. The cloud-based resource of claim 2, wherein the declarative statement includes code for executing the request, the code including the read or write operation, the one or more fields, and/or the user identification.

4. The cloud-based resource of claim 2, wherein the request from the cloud-based application is parsed to determine the one or more parameters by translating a raw expression for the declarative statement from the request into a general match expression.

5. The cloud-based resource of claim 3, wherein translating the raw expression for the declarative statement from the request into the general match expression comprises interpolating the raw expression from the request to replace one or more placeholders in the raw expression with corresponding values.

6. The cloud-based resource of claim 4, wherein translating the raw expression for the declarative statement from the request into the general match expression further comprises converting the interpolated expression into the general match expression.

7. The cloud-based resource of claim 5, wherein translating the raw expression for the declarative statement from the request into the general match expression further comprises evaluating the general match expression against a value.

8. The cloud-based resource of claim 1, wherein transmitting, based on the request and the one or more fields, the database request to the remote database comprises transmitting the database request to the remote database, and, based on a response from the remote database, transmitting the service request to a service.

9. A method for a cloud-based resource for servicing a request from a cloud-based application to access data from a remote database, comprising:
receiving, from a cloud-based application, a request to access data from a remote database, the remote database including a plurality of documents;
determining, from the request, a user identification and one or more fields to be accessed for a read or write operation;
applying a first set of rules to determine whether the cloud-based application is allowed to access the one or more fields based on whether a user role associated with the user identification is authorized to request the read or write operation;
identifying a first document subset including a subset of documents of the plurality of documents;
transmitting, based on the request and the one or more fields, a database request to the remote database;
accessing, at the cloud-based resource, one or more results from the remote database responsive to the database request;
applying a second set of rules;
identifying a second document subset including a subset of documents of the first document subset; and
transmitting, based on a determination according to the first set of rules that cloud-based application is allowed to access the one or more fields based on the user role and based on an identification according to the second set of rules, the one or more results to the cloud-based application, the one or more results including the second document subset,
wherein transmitting the one or more results including the second document subset comprises providing, responsive to a request associated with an unprivileged user role, a response, wherein the response includes an output prepared using underlying data and the response does not expose the underlying data.

10. The method of claim 9, wherein the request includes a declarative statement to determine one or more parameters for the first set of rules and/or the second set of rules.

11. The method of claim 10, wherein the declarative statement includes code for executing the request, the code including the read or write operation, the one or more fields, and/or the user identification.

12. The method of claim 11, wherein the request from the cloud-based application is parsed to determine the one or more parameters by translating a raw expression for the declarative statement from the request into a general match expression.

13. The method of claim 12, wherein translating the raw expression for the declarative statement from the request into the general match expression comprises interpolating the raw expression from the request to replace one or more placeholders in the raw expression with corresponding values.

14. The method of claim 13, wherein translating the raw expression for the declarative statement from the request into the general match expression further comprises converting the interpolated expression into the general match expression.

15. The method of claim 14, wherein translating the raw expression for the declarative statement from the request into the general match expression further comprises evaluating the general match expression against a value.

16. The method of claim 9, wherein transmitting, based on the request and the one or more fields, the database request to the remote database comprises transmitting the database request to the remote database, and, based on a response from the remote database, transmitting the service request to a service.

17. The cloud-based resource of claim 1, further comprising limiting transmission of documents to the cloud-based application to the results including the second document subset.

18. The cloud-based resource of claim 17, wherein the cloud-based application is configured to be displayed on a mobile device.

* * * * *